United States Patent
Brunvold et al.

(10) Patent No.: US 12,442,375 B2
(45) Date of Patent: Oct. 14, 2025

(54) SUBSEA FLUID PROCESSING SYSTEM HAVING A CANNED FLUID-FILLED STATOR AND COOLING MECHANISM

(71) Applicant: OneSubsea IP UK Limited, London (GB)

(72) Inventors: Anders Brunvold, Sandsli (NO); Aasmund Valland, Sandsli (NO); Helge Dale, Raadal (NO)

(73) Assignee: OneSubsea IP UK Limited, London (GB)

( * ) Notice: Subject to any disclaimer, the term of this patent is extended or adjusted under 35 U.S.C. 154(b) by 185 days.

(21) Appl. No.: 17/171,305

(22) Filed: Feb. 9, 2021

(65) Prior Publication Data

US 2022/0252070 A1 Aug. 11, 2022

(51) Int. Cl.
*F04D 13/06* (2006.01)
*C02F 1/44* (2023.01)
(Continued)

(52) U.S. Cl.
CPC ....... *F04D 13/0626* (2013.01); *F04D 13/086* (2013.01); *F04D 29/20* (2013.01);
(Continued)

(58) Field of Classification Search
CPC .. F04D 13/062; F04D 13/0626; F04D 13/086; F04D 13/08–10; F04D 13/12;
(Continued)

(56) References Cited

U.S. PATENT DOCUMENTS 3,022,739 A * 2/1962 Herrick ................... F04D 1/063
417/350
3,413,404 A * 11/1968 Macfadyen .............. H01B 3/20
252/573

(Continued)

FOREIGN PATENT DOCUMENTS

AU 6318099 A 6/2001
CN 102701504 A 10/2012
(Continued)

OTHER PUBLICATIONS

Stover et al., "Barrier Fluidless, Sealless Seawater Canned Motor Pumps", OTC-29473-MS, Offshore Technology Conference, May 2019, 11 pages.

(Continued)

*Primary Examiner* — Alexander B Comley
(74) *Attorney, Agent, or Firm* — Jeffrey D. Frantz

(57) ABSTRACT

A subsea fluid processing system includes an electric motor that rotates a shaft on which impellers are fixedly mounted. Diffusors are static and fixed to the pump housing. The electric motor includes a rotor surrounding the shaft and a stator that is filled with a dielectric stator fluid. The stator is sealed or "canned." The inner surface of the stator which faces the rotor is canned with a canning non-metallic material. The motor, as well as bearings for the rotating shaft are lubricated and cooled with a fluid that in some cases is taken from the process fluid and some alternative source. Alternative sources include: MEG, methanol, treated seawater and untreated seawater.

15 Claims, 15 Drawing Sheets

(51) Int. Cl.
*F04D 13/08* (2006.01)
*F04D 29/20* (2006.01)
*F04D 29/40* (2006.01)
*H02K 1/20* (2006.01)
*H02K 5/132* (2006.01)
*C02F 103/08* (2006.01)
*F04D 1/06* (2006.01)
*F04D 29/58* (2006.01)

(52) U.S. Cl.
CPC .......... *F04D 29/406* (2013.01); *H02K 5/132* (2013.01); *F04D 1/06* (2013.01); *F04D 13/062* (2013.01); *F04D 29/5806* (2013.01)

(58) Field of Classification Search
CPC .......... F04D 29/041–0416; F04D 1/06; F04D 29/5806; H02K 1/20; H02K 5/132
See application file for complete search history.

(56) References Cited

U.S. PATENT DOCUMENTS

| | | | |
|---|---|---|---|
| 4,185,704 A | | 1/1980 | Nixon, Jr. |
| 4,198,191 A | | 4/1980 | Pierce |
| 4,460,181 A | | 7/1984 | Araoka |
| 5,888,053 A | * | 3/1999 | Kobayashi .......... F04D 29/445 417/244 |
| 6,109,372 A | | 8/2000 | Dorel et al. |
| 6,171,483 B1 | | 1/2001 | Eden et al. |
| 6,318,481 B1 | | 11/2001 | Schoeffler |
| 6,626,254 B1 | | 9/2003 | Krueger et al. |
| 7,569,097 B2 | | 8/2009 | Campen et al. |
| 7,731,843 B2 | | 6/2010 | Pinchin |
| 8,393,876 B2 | | 3/2013 | Sloteman et al. |
| 8,487,493 B2 | * | 7/2013 | Cunningham ...... F04D 13/0626 318/599 |
| 9,062,542 B2 | | 6/2015 | Sahni |
| 9,206,819 B2 | * | 12/2015 | Maier .................. H02K 9/12 |
| 9,464,516 B2 | | 10/2016 | Ayirala et al. |
| 9,470,080 B2 | * | 10/2016 | Kommepalli .......... E21B 43/40 |
| 9,583,988 B2 | * | 2/2017 | Hansen .............. F04D 13/0626 |
| 9,954,414 B2 | * | 4/2018 | Cunningham .......... F04D 13/06 |
| 9,964,113 B2 | * | 5/2018 | Westberg .............. F04D 13/023 |
| 10,160,662 B2 | | 12/2018 | Grimstad et al. |
| 10,370,272 B2 | * | 8/2019 | Knox-Holmes .......... C02F 1/70 |
| 10,801,502 B2 | | 10/2020 | Brunvold |
| 10,859,084 B2 | | 12/2020 | Valland et al. |
| 2001/0011591 A1 | | 8/2001 | Van-Drentham Susman et al. |
| 2001/0012487 A1 | * | 8/2001 | Takura .................. F04D 3/00 417/423.5 |
| 2002/0088648 A1 | | 7/2002 | Krueger et al. |
| 2003/0145991 A1 | | 8/2003 | Olsen |
| 2005/0023222 A1 | | 2/2005 | Baillie |
| 2005/0029192 A1 | | 2/2005 | Arnold et al. |
| 2005/0112003 A1 | | 5/2005 | Jones et al. |
| 2006/0243670 A1 | | 11/2006 | Pinchin |
| 2007/0090039 A1 | | 4/2007 | Young et al. |
| 2007/0200438 A1 | | 8/2007 | Kaminski |
| 2009/0057223 A1 | | 3/2009 | Young et al. |
| 2009/0217992 A1 | | 9/2009 | Wilson |
| 2010/0129237 A1 | | 5/2010 | Eide et al. |
| 2010/0171383 A1 | * | 7/2010 | Petrov .................. H02K 3/28 310/156.28 |
| 2011/0008184 A1 | | 1/2011 | De Boer |
| 2011/0040485 A1 | | 2/2011 | Ong |
| 2011/0052432 A1 | | 3/2011 | Cunningham et al. |
| 2012/0107051 A1 | | 5/2012 | Sweeney et al. |
| 2012/0205307 A1 | | 8/2012 | Boudinar |
| 2013/0195618 A1 | * | 8/2013 | Kleynhans .............. F04D 29/063 415/110 |
| 2014/0205475 A1 | | 7/2014 | Dale |
| 2014/0241907 A1 | | 8/2014 | Grynning et al. |
| 2016/0304371 A1 | | 10/2016 | Wang et al. |
| 2016/0368800 A1 | | 12/2016 | Eriksen et al. |
| 2017/0261004 A1 | * | 9/2017 | Hofstad .................. F04D 13/12 |
| 2017/0267545 A1 | | 9/2017 | Grimstad et al. |
| 2017/0298755 A1 | * | 10/2017 | Mizukami .......... F04D 29/4206 |
| 2017/0306733 A1 | | 10/2017 | Reeves |
| 2017/0306966 A1 | * | 10/2017 | Valland ................ F04D 29/041 |
| 2018/0038388 A1 | * | 2/2018 | Mizukami ................ H02K 7/14 |
| 2018/0038515 A1 | | 2/2018 | Dixon |
| 2018/0194658 A1 | | 7/2018 | Plasencia |
| 2018/0216448 A1 | * | 8/2018 | Bittencourt .......... F04D 13/0693 |
| 2019/0145415 A1 | * | 5/2019 | Brunvold .............. F04D 29/528 417/423.12 |
| 2019/0169968 A1 | | 6/2019 | Kanstad et al. |
| 2020/0032630 A1 | | 1/2020 | Artinian |
| 2020/0224519 A1 | | 7/2020 | Kleemeier et al. |
| 2020/0263680 A1 | | 8/2020 | Bourne |
| 2022/0003091 A1 | | 1/2022 | Kjellnes |
| 2022/0136636 A1 | | 5/2022 | Kjellnes |
| 2022/0252071 A1 | | 8/2022 | Brunvold |

FOREIGN PATENT DOCUMENTS

| | | | | |
|---|---|---|---|---|
| EP | 0562147 A1 | | 9/1993 | |
| EP | 0594418 A1 | | 4/1994 | |
| EP | 0770760 A1 | | 5/1997 | |
| EP | 0877895 B1 | | 4/2003 | |
| EP | 0986692 B1 | | 1/2006 | |
| EP | 3 730 795 | * | 10/2020 | ............... F04D 1/06 |
| NO | 20150956 A1 | | 1/2017 | |
| WO | 9834003 A1 | | 8/1998 | |
| WO | 0028188 A1 | | 5/2000 | |
| WO | 2011053752 A1 | | 5/2011 | |
| WO | 2012121605 | | 9/2012 | |
| WO | 2012163996 A2 | | 12/2012 | |
| WO | 2014206919 A1 | | 12/2014 | |
| WO | 2015103017 A1 | | 7/2015 | |
| WO | 2015123736 A1 | | 8/2015 | |
| WO | 2015138898 A1 | | 9/2015 | |
| WO | 2016189397 | | 12/2016 | |
| WO | 2017013027 A1 | | 1/2017 | |
| WO | 2017157860 A1 | | 9/2017 | |
| WO | 2017186448 A1 | | 11/2017 | |
| WO | WO-2018077527 A1 | * | 5/2018 | |
| WO | 2022155568 | | 7/2022 | |

OTHER PUBLICATIONS

International Search Report and Written Opinion dated Jun. 26, 2017 for International Application No. PCT/EP2017/055859.
Search Report and Written Opinion issued in International Patent Application No. PCT/US2022/015762 dated May 19, 2022, 10 pages.
Office Action issued in U.S. Appl. No. 17/366,312 dated Jun. 8, 2022, 22 pages.
Hermetic canned motor pumps acc. To API 685, Lederle Hermetic, available at: https://www.hermetic-pumpen.com/en/api-685, 3 pages.
Feldle, "Canned motor pumps in compliance with Api 685—A contribution to environmental protection", Technical Report, Lederle Hermetic, 13 pages. Available at: https://www.hermetic-pumpen.com/_Resources/Persistent/8b2405ffbe4cfaeb9cb81470b3b8140800e34723/Fachbericht_Spaltrohrmotorpumpen_API_685_EN.pdf.
Office Action issued in U.S. Appl. No. 17/353,718 dated Apr. 26, 2023, 35 pages.
Search Report and Written Opinion issued in the PCT Application No. PCT/US2022/012667 dated Apr. 25, 2022, 11 pages.
International Preliminary Report on Patentability issued in the PCT Application No. PCT/US2022/015762 dated Aug. 24, 2023, 6 pages.
International Preliminary Report on Patentability issued in the PCT Application No. PCT/US2022/012667 dated Jul. 27, 2023, 8 pages.
Office Action issued in U.S. Appl. No. 17/574,246 dated Apr. 23, 2024, 40 pages.
Office Action issued in U.S. Appl. No. 18/261,634 dated Jul. 10, 2024, 30 pages.
Search and Examination report issued in European Patent Application 22740208.8 on Nov. 12, 2024, 6 pages.

(56) References Cited

OTHER PUBLICATIONS

Extended Search Report issued in European Patent Application No. 22753238.9 dated Nov. 20, 2024, 6 pages.

* cited by examiner

SUBSEA FLUID PROCESSING SYSTEM HAVING A CANNED FLUID-FILLED STATOR AND COOLING MECHANISM

TECHNICAL FIELD

The present disclosure relates to subsea fluid processing systems and methods. More particularly, the present disclosure relates to subsea systems and methods for proceeding fluid, such as pressure support for a subsea seawater treatment and injection systems.

BACKGROUND

Many known conventional subsea fluid pumps use a continuous supply of barrier fluid. The barrier fluid protects and cools the motor, and acts as a lubricant in internal components like bearings and mechanical seals. The barrier fluid is often pressurized to a higher level than the pumped/processed fluid; in this way serves to form a "barrier" between the process fluid and other area of the pump, such as the motor. Due to the over-pressure, there is an intended small consumption, or "leakage", of barrier fluid into the process fluid across the mechanical seals of the pump.

For more some water injection systems there are strict filtration demands. For example, there is an increasing demand for sulphate removal capabilities. Sulphate removal can significantly reduce the risk of crystallization of sulphates in the reservoir. Such crystallization can negatively affect permeability in the reservoir rock. A nano filter can be used to remove small sulphate molecules. It is believed that the larger barrier fluid molecules may have a negative impact on this type of filter's performance. As a result, there is an increase demand for subsea pumps for the sea water filter processing that are barrier fluid-less. Such nano filters rely on upstream pretreatment filtration and biological treatment features, and in addition such nano filters will have a partial flow to the external environment. Thus, for this additional reason barrier fluid-less for subsea seawater treatment and injection systems are desirable.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a subsea process fluid processing system is described. The system includes: static diffusers fixed to a pump housing; an elongated impeller shaft; a set of impellers fixedly mounted to the impeller shaft and configured to increase pressure of a process fluid when the impeller shaft is rotated; and an electric motor configured to impart torque on the impeller shaft thereby causing the impeller shaft to rotate about a main longitudinal axis. The electric motor includes: a rotor fixedly mounted to the impeller shaft; and a canned fluid filled stator, dimensioned and positioned to surround the rotor, and filled with a dielectric stator fluid and sealed at least with a canning of non-metallic material on an inner surface facing the rotor.

According to some embodiments, a fluid passes between the inner surface of the canned stator and the rotor. The fluid can be sourced, at least in part, from the process fluid. In other embodiments, the fluid can be taken from the surrounding seawater. In other embodiments, the fluid can be water that is treated (e.g. filtered, desalinated, and/or oxygen scavenged) seawater. In yet other embodiments, the fluid can be supplied from a subsea reservoir or tank that is periodically refilled.

According to some embodiments, the non-metallic stator canning material is a material that does not conduct electricity. Examples include a polymer-based material that can include glass fiber. In other cases, stator canning material can include synthetic fibers like aramid fibers, Kevlar fibers and/or carbon fibers.

According to some embodiments, the system can further include a device configured to adjust the volume and/or pressure of the dielectric stator fluid according to environmental fluctuations, thereby reducing stress on the stator canning material.

According to some embodiments, the system is configured as a pump for pumping the process fluid. For example, the system could be configured to pump sea water through a subsea seawater treatment system. According to another example, the system could be configured to pressurize treated seawater for injection into reservoirs.

According some other embodiments, the system could be configured as a subsea pump or fluid compressor for processing fluids that contain gas and/or abrasive solids.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1A:
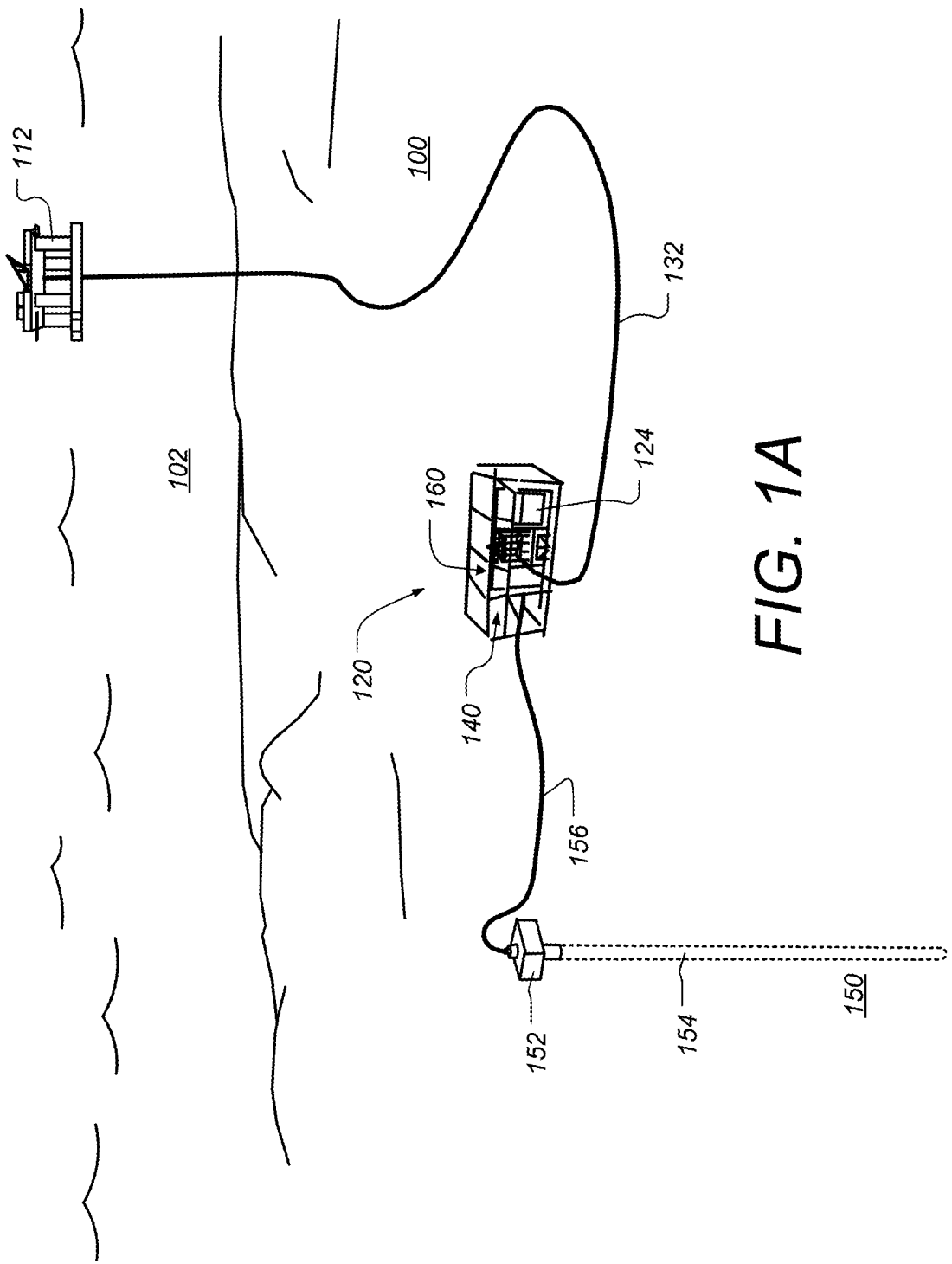
FIGS. 1A and 1B are diagrams illustrating a subsea environment in which an electric barrier fluid-less subsea pump can be deployed, according to some embodiments.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name, but not function.

Processing of fluid in a subsea setting has various applications. One such application subsea fluid pumping. According to some embodiments, seawater injection is used to increase recovery of hydrocarbons from a subterranean formation by pumping seawater into the formation to force the hydrocarbons to flow towards the production wells. The increased pressure in the field can also stimulate production.

For some water injection systems there are particular filtration and water treatment requirements. For example, there is an increasing demand for sulphate removal capabilities. Sulphate removal can significantly reduce the risk of crystallization of sulphates in the reservoir. These types of filters are often referred to as nano filters. These filters typically have both a permeation flow and a reject flow. The reject flow contains the "waste" from the process. A filtration system can be used to remove small sulphate molecules. It is believed that the larger barrier fluid molecules may have a negative impact on the downstream filter's performance. Another aspect is that barrier fluid may follow the reject flow and may contain chemical elements which may be harmful to some sea organisms. As a result, there is an increased demand for barrier fluid-less subsea pumps for the seawater filter processing. According to some embodiments, an electric barrier fluid-less subsea fluid pump is used for fluid processing, such as filtration pumping applications.

According to some embodiments, other subsea fluid processing applications can include processing carbon dioxide or hydrocarbons with a system that uses seawater as a barrier fluid in an electric pump. According to some embodiments, a small amount of water flow can be directed through the bearings and the mechanical seals. Abrasive particles and gas can be avoided in the canned motor region of the system. In the case of carbon dioxide and hydrocarbon processing applications, according to some embodiments, other fluid that may be available subsea, such as monoethylene glycol MEG,) methanol, condensate or pretreated hydrocarbon can be used as a barrier fluid provided that such fluid is relatively low in abrasive particles and/or gas. In some applications where carbon dioxide and/or hydrocarbon are being processed, the use of sea water as a consumable barrier fluid may increase the risk of corrosion. According to some embodiments, a known system for desalination could be deployed. According to some other embodiments, oxygen scavenged water, such as by using known chemical oxygen scavenging techniques, can be used.

Figure 1B:
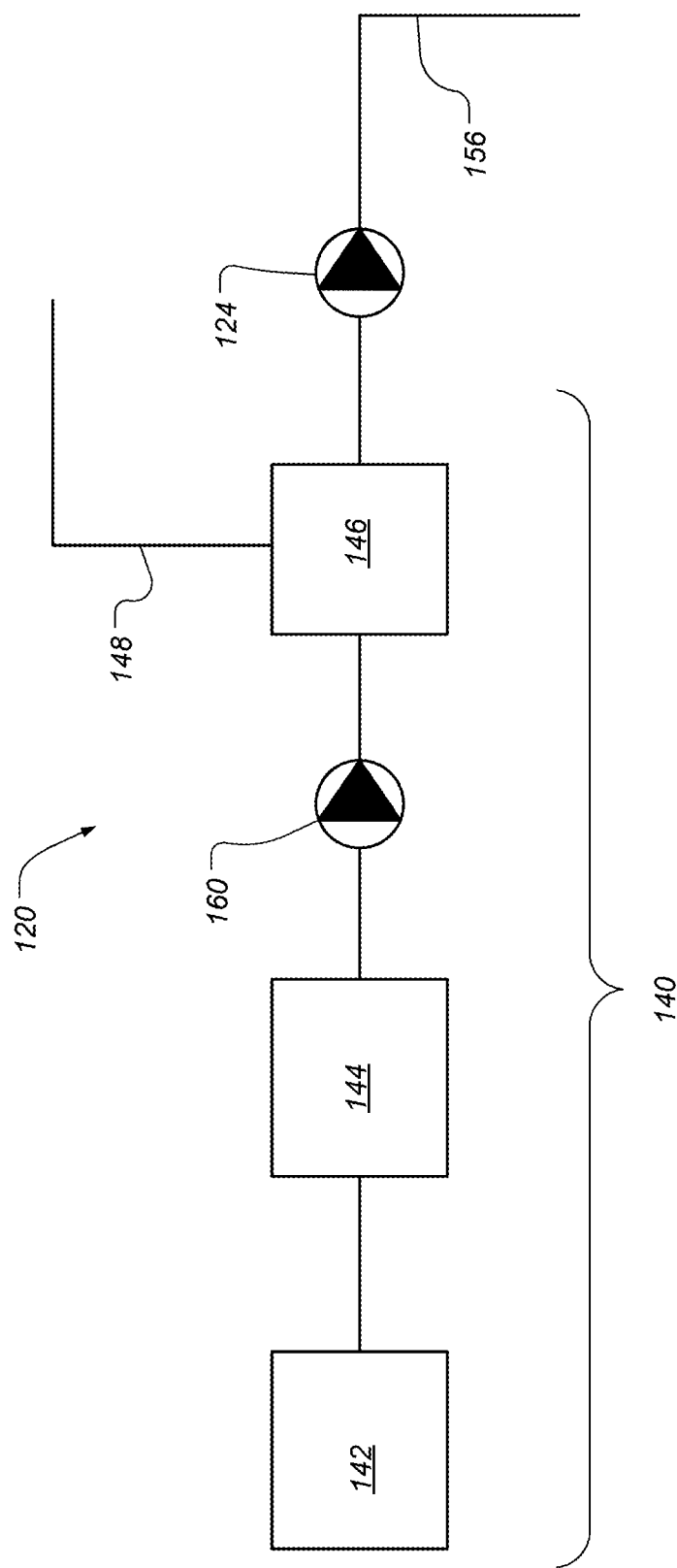

FIGS. 1A and 1B are diagrams illustrating a subsea environment in which an electric barrier fluid-less subsea pump can be deployed, according to some embodiments. In FIG. 1A, on sea floor 100 a subsea station 120 is shown which is near wellhead 152 for injection well 154. Injection well 154 is being used to increase overall recovery of hydrocarbons from a subterranean formation 150, as well an increased pressure in the field to further optimize production. Station 120 includes a subsea sea water treatment and injection system (seawater treatment system 140), which is powered by one or more electric motors, such as permanent magnet or induction motors. The station 120 is connected to an umbilical cable, such as umbilical 132, which supplies power to the electric motors in station 120. The umbilical in this case is being run from a platform 112 through seawater 102, along sea floor 100 to station 120. In other cases, the umbilicals may be run from some other surface facility such as a floating production, storage and offloading unit (FPSO), or a shore-based facility. The umbilical 132 can also be used to supply other fluids to station 120, as well as include control and data lines for use with pumps and other subsea equipment in station 120. According to some embodiments, seawater treatment system 140 includes an all-electric pump 160 configured to process fluids within station 120. According to some embodiments, pump 160 is an all-electric pump, in that it does not rely on a continuous fluid supply from the surface. As used herein the term "all-electric" refers to a subsea electric motor or pump that relies on electricity for power and does not rely on a continuous fluid supply from the surface. Examples include a barrier fluid free system, as well as systems that consume sea water or some other fluid that is available subsea. Examples of fluids that could be available subsea without a continuous surface supply include sea water, desalinated or otherwise treated sea water, as well as fluids such as MEG or methanol that may be stored subsea in tanks or containers that are periodically resupplied. According to some embodiments, water that has been treated to reduce dissolved oxygen can be used in applications that is particularly sensitive to corrosion. For example oxygen scavenged water, such as by known chemical processes and techniques can be used.

According to some embodiments, the subsea injection equipment is located at the seabed relatively close to the wellhead to lower costs and losses of the high pressure piping downstream of the pumps. Another reason is that the topside platform may have restrictions on equipment due to space and weight restrictions. According to some embodiments, seawater is used for the injection. As the seawater contains impurities such as particles, algae, oxygen and sulfate, seawater treatment system 140 reduces these impurities to an acceptable level prior to injection. Further detail of seawater treatment system 140 is shown in FIG. 1B. According to some embodiments, subsea filtration system 140 includes multiple filtration components and other treatment features to mitigate marine growth etc. In the example shown in FIG. 1B, seawater treatment and filtration system 140 includes initial pretreatment module 142, ultrafiltration system 144 and a nano filtration system 146. Pretreatment module 142 can be configured with initial filtering and biodegradation capability. The ultrafiltration system 144 can be configured to remove particles greater than about 0.1 micron while the nano filtration system 146 is configured to remove sulfates and/or dissolved salt from the water being injected into formation 150. Seawater treatment system 140 includes an all-electric pump 160 that is upstream from the nano filtration system 146. According to some embodiments, nano filtration system 146 includes a reject flow line 148. Downstream of the seawater treatment system 140 is injection pump 124 which is used to inject high pressure treated seawater through conduit 156 to wellhead 152. In many cases, the nanofiltration system 146 includes one or more membranes that could be negatively affected by barrier fluids used in the any upstream equipment such as filtration electric pump 160. According to some embodiments, an all-electric pump 160 is used to satisfy the nano filtration requirement of system 146.

Figure 2A:
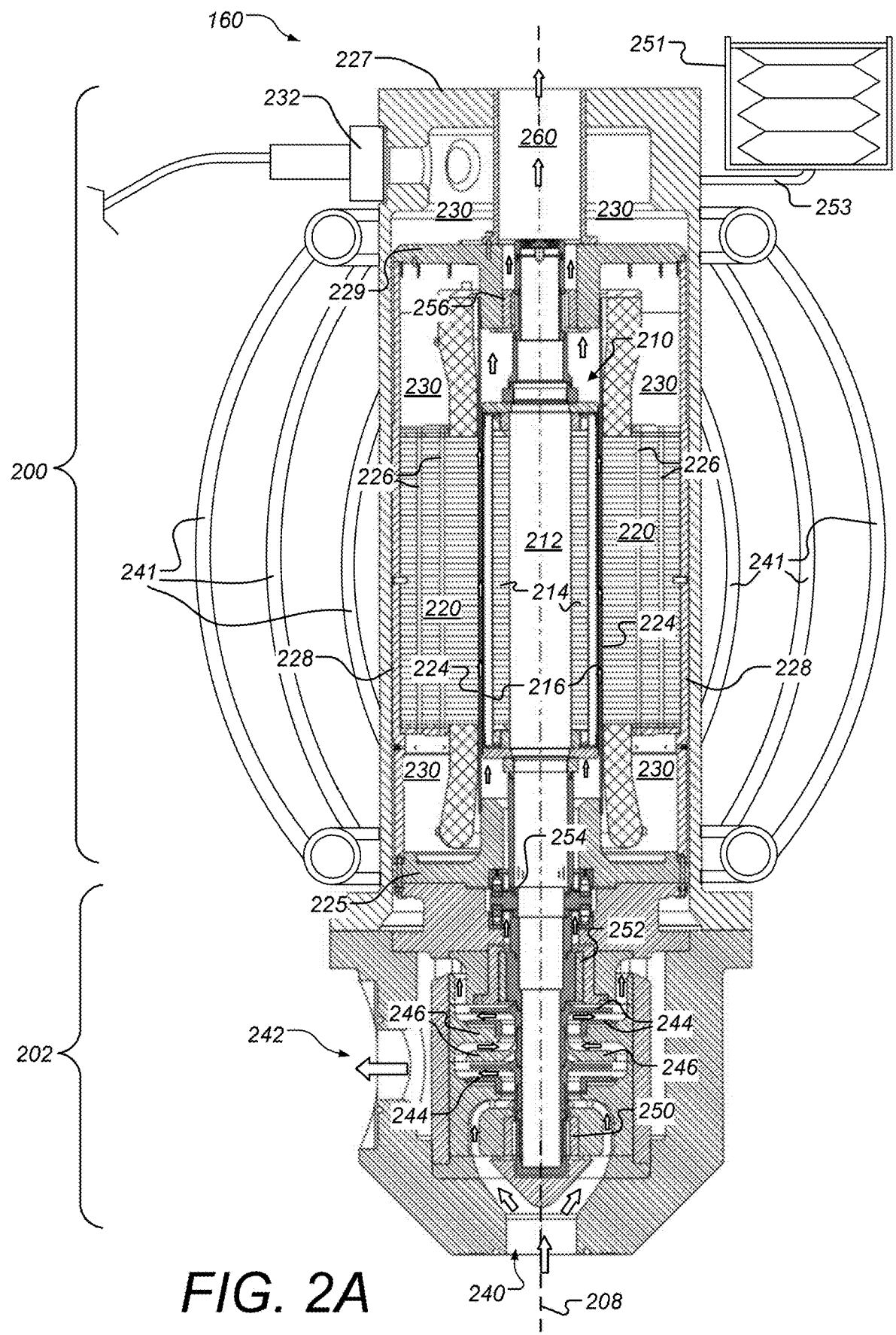
FIGS. 2A and 2B are cross section diagrams showing further detail of electric subsea fluid processing machines, according to some embodiments.
Figure 2B:
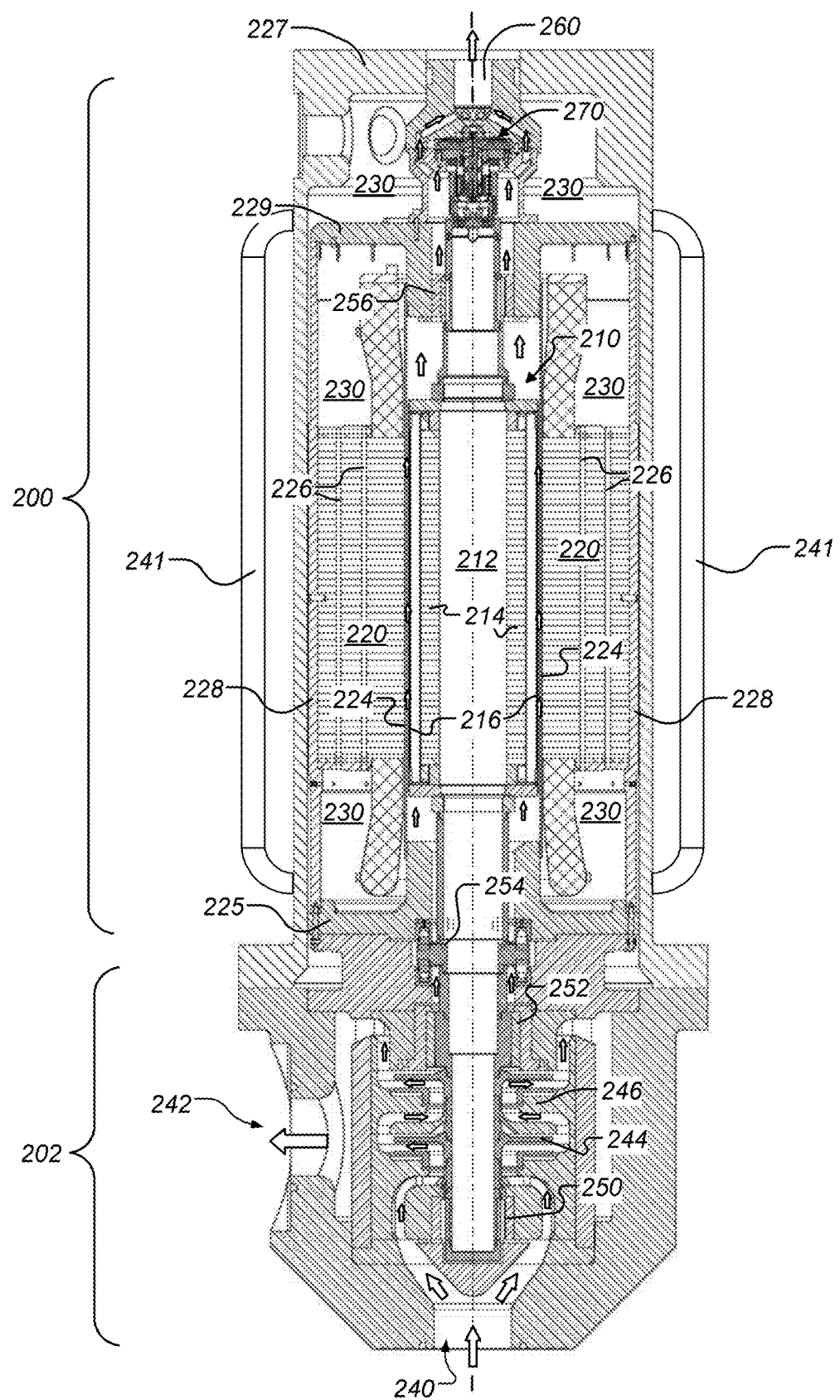

FIGS. 2A and 2B are cross section diagrams showing further detail of all electric subsea fluid processing machines, according to some embodiments. Shown in both FIGS. 2A and 2B are versions of a pump 160 that can be used for subsea fluid processing, such as for pumping sea water in a subsea filtration system such as system 140 shown in FIGS. 1A and 1B. The fluid processing machines shown in FIGS. 2A and 2B are configured for processing single phase fluids. The fluid processing machines are configured with a canned stator, that uses an electrically non-conductive inner canning material 224 facing the rotor, resulting in lower losses when compared with machines using conductive stator inner canning material.

FIG. 2A shows pump 160 generally including an electric motor portion 200 and a fluid processing portion 202. According to some embodiments, the motor portion 200 is configured as a permanent magnet motor and includes a central rotor portion 210 and a stator portion 220. According to some other embodiments, the motor can be configured with windings and motor portion 200 is configured as an induction motor. According to some embodiments, the rotor portion 210 can then include a solid central rotor shaft 212, and a stacked up electrical sheet with multiple longitudinal copper bars 214 that are arranged circumferentially around the central rotational and longitudinal axis 208. According to some embodiments, the copper bars 214 are short circuited in each end as is typical with "squirrel cage" induction motors. According to some embodiments, the rotor portion 210 can be a "wrapped design" in which shaft 212 is formed of a magnetic carbon steel core and a stainless steel containment 216 that surrounds and encapsulates electrical sheet stacked up bars 214. The rotor containment 216 can be sealed at its ends by welding to prevent process fluid ingress. According to some embodiments, the stator portion 220 is configured as a "canned stator" which includes stators 220 that are surrounded by a dielectric fluid such as dielectric oil which is isolated, sealed or "canned." The stator inner canning 224 may be sealed in each end interfacing steel parts with O-ring seals or similar, to prevent process fluid ingress.

According to some embodiments the motor portion 200 is configured as a permanent magnet motor, the rotor portion 210 can include a solid central rotor shaft 212, and 214 refers to permanent magnets. According to some embodiments, the rotor portion 210 can be hermetically sealed by means of a polymer or other material providing hermetically sealing and has resistance to corrosion. According to some embodiments, the canned stator is contained by an outer sleeve 228, end pieces 225 and 227 and inner canning 224. Note that in the examples shown in FIGS. 2A and 2B, the end piece 229 has channels (not shown) that allow the dielectric fluid to also fill the volume above end piece 229. The dielectric fluid is thus in fluid communication with pipe 253. According to some embodiments, the inner canning 224 is made of non-metallic material. This material is configured to be non-conductive in the direction of the rotational electrical field as generated by the motor stator 220. Configuring the inner canning 224 to be non-conducting in this way avoids induced currents and hence electromagnetic losses due to the motor stator canning. The inner canning 224 as shown in the examples of FIGS. 2A and 2B is essentially a pipe section that isolates the stator from the rest of the machine, making a separate closed chamber or volume 230 for the stator 220 and motor penetrator. According to some embodiments, the stator 220 also is configured with integrated cooling channels 226. The volume 230 and cooling channels 226 are filled with an environmental dielectric fluid, that is circulated in a closed loop either by natural circulation (heat/density differences), or alternatively by a forced circulation generated by a shaft driven impeller 270 (as shown in FIG. 2B). One of skill in the art will recognize that, an impeller such as impeller 270 or other pump can be provided for circulating fluid in motor volume (such as volume 230) in many other embodiments described herein including those of FIGS. 3, 4A, 4B, 5, and 6A-6G.

According to some embodiments, the canning material 224 is a polymer material, or a polymer composite material that is reinforced with glass, aramid, kevlar or carbon fibers. Note that in the case of carbon fiber, which is generally electrically conductive a consideration of electromagnetic losses can be made if that material is used. According to some embodiments, another non-metallic material alternative for inner canning 224 is a ceramic material, which has increased tolerance to solids and erosion. According to some embodiments, the canning material 224 has thickness along its central portion (i.e. adjacent the stator 220) of about 3-10 mm. According to some embodiments, the gap between canning material 224 and the containment 216 of rotor portion 210 is about 1-8 mm. According to some embodiments, the gap between stator 220 and canning material 224 is about 0-2 mm. According to some embodiments, the electrical sheets or permanent magnets are encapsulated by rotor containment 216 of a thickness 0.5-3 mm. According to some embodiments, the total electromagnetic gap distance between the stator and rotor is from about 3 to 20 mm. According to some embodiments, the canning material 224 has thickness along its central portion (i.e. adjacent the stator 220) of about 3-6 mm. According to some embodiments, the gap between canning material 224 and the rotor containment 216 of rotor portion 210 is about 2-4 mm. According to some embodiments, the gap between stator 220 and canning material 224 is about 0-1 mm. According to some embodiments, the electrical sheets or permanent magnets are encapsulated by rotor containment 216 of a thickness 0.5-1.5 mm.

According to some embodiments, the total electromagnetic gap distance between the stator and rotor is from about 6 to 14 mm.

The fluid processing portion 202 includes a process fluid inlet 240 and a process fluid outlet 242. The hollow arrows are used to indicate approximate flow directions of the process fluid. The central shaft 212, in this case a solid shaft, is rotated by the motor portion 200. The rotating shaft 212 has impeller stages 244 directly physically mounted to it. Adjacent to the impellers are diffusors 246 that are fixedly mounted to the housing of portion 202. According to some embodiments, the central rotating shaft 212 can be provided in two or more pieces, rather than a single solid piece, wherein the two or more pieces are mechanically and fixedly coupled to each other. Such coupling might be desirable, for example, to accommodate heat expansion and/or dynamics, or provide ease of assembly. The impeller stages 244 and diffuser stages 246 act to increase the pressure on the process fluid such that the fluid pressure at the outlet 242 is higher than at the inlet 240. Also shown are two radial bearings 250 and 256, balance piston 252 and thrust bearing 254. As shown by the arrows, a small amount of process fluid flows (or leaks) past the balance piston 252 and flows between the rotor and stator in the motor section 200. In the case of FIG. 2A, the process fluid flow out of the upper vent 260 of pump 160. The small portion of process fluid that passes the balance piston 252 and continues through the machine lubricates bearings and cools the motor portion 200 before returning to the outside subsea environment. This enables pressure equilibrium to the surrounding environment at all times for the canned stator and therefore allows for relatively thin and greater flexibility in the selection of material used for the inner stator canning 224. According to some embodiments, the stator cavity is also pressure compensated to the environment via a bellows or other pressure compensation device (not shown) attached to stator cavity that is filled with dielectric fluid. The described configurations are an effective protection for pressure transient loads to the inner stator canning 224 which allows for closer rotor to stator spacing and ability to use non-conducting canning materials. Both the closer rotor to stator spacing, and non-conducting canning material in general decreases losses in the motor.

According to some embodiments, the motor stator volume 230 is filled with a dielectric which can be cooled in a closed loop circuit. In FIG. 2A, the stator fluid relies on natural circulation. In FIG. 2B, the stator fluid is circulated by a shaft driven impeller 270. This shaft driven impeller 270 in the case of FIG. 2B, is directly driven by the shaft 212. According to other embodiments, the circulation pump can be separately electrically driven or driven by a magnetic coupling which takes power from the main pump/motor shaft 212. Also shown in FIG. 2A is a stator volume compensator 251. Additionally, external cooling pipes 241 are shown in both FIGS. 2A and 2B in slightly different configurations. According to some embodiments, the cooling pipes 241 can be arranged in different configurations, such as circumferentially spiraled about the outside of the housing of motor portion 200. Also shown in FIG. 2A is a penetrator 232 which is used to provide electrical connection to the motor portion 200.

According to some embodiments, the layout of the pump portion 202 is arranged and configured differently than shown depending on the particular application. For example, other numbers of impeller and diffuser stages can be used (instead of two), and/or the process fluid inlet 240 can be on the side rather than at the bottom.

Figure 3:
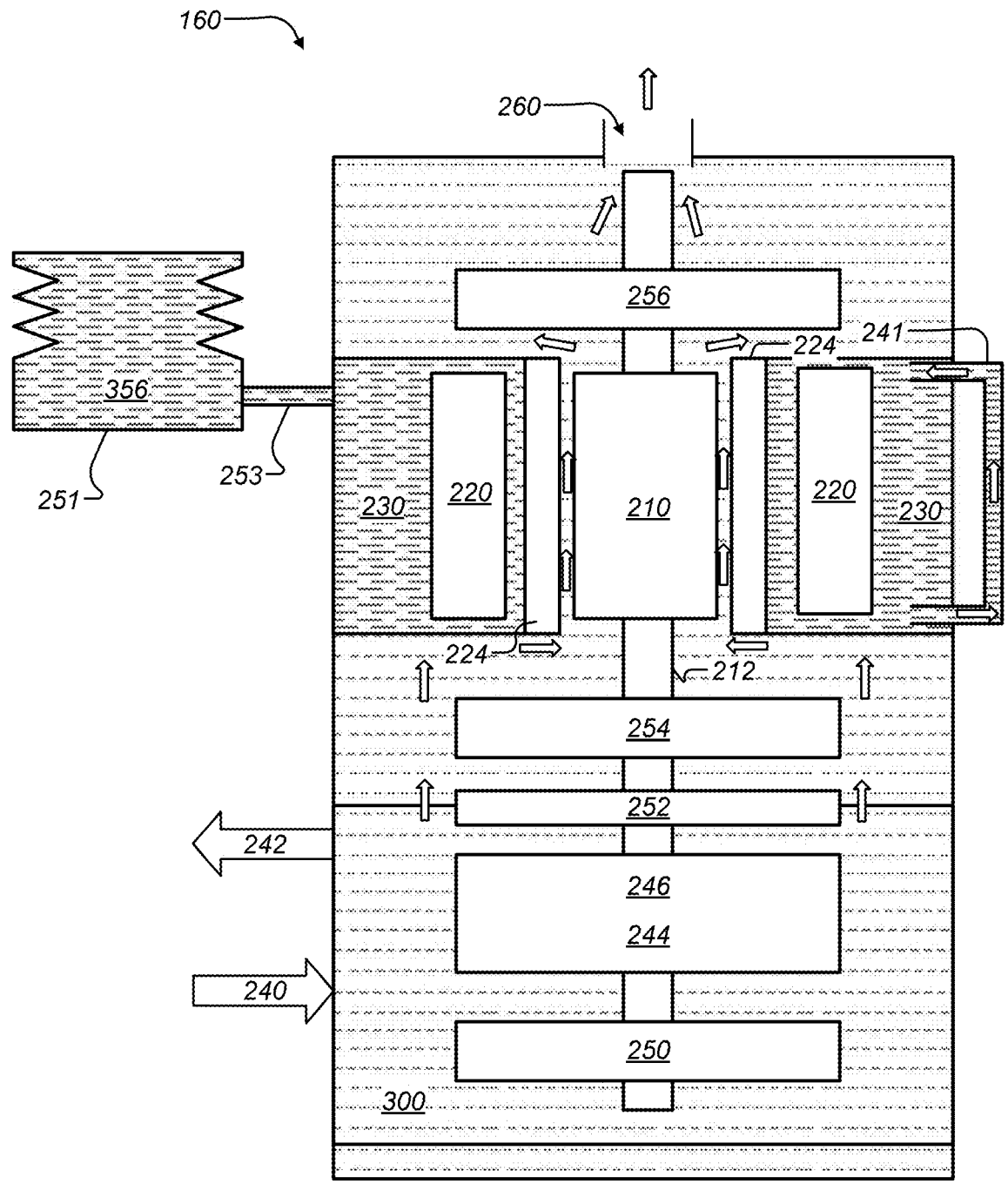
FIG. 3 is a block diagram illustrating further aspects of an electric subsea fluid processing machine, according to some embodiments.

FIG. 3 is a block diagram illustrating further aspects of an electric subsea fluid processing machine, according to some embodiments. The compact electric pump 160 is as shown and described in FIGS. 2A and 2B. The single shaft 212 includes upper and lower radial bearings 250 and 256, respectively. The balance piston 252 acts as a center bushing adding support to shaft 212. The pump 160 is an "open" design in that the rotor 210 and bearings 250, 254 and 256 are open to the outside environment via upper vent 260. The open configuration provides protection to the pump 160 and in particular stator canning 224, from pressure transients. In FIG. 3, the process fluid is shown by reference number 300 while the dielectric stator fluid is shown by reference number 356. A small portion of process fluid 300 passes the balance piston 252 and continues through the machine lubricating bearings and cooling before exiting through upper vent 260. Also shown in FIG. 3 is pressure/volume compensator 251 and external cooling pipe(s) 241. Compensator 251 is configured to compensate for pressure/volume changes in the dielectric stator fluid 356 via pipe 253, while cooling pipe(s) 241 are configured to provide cooling of the dielectric stator fluid 356. Note that while cooling pipe 241 is schematically shown on one side of the pump 160, in practice, as with the other embodiments described herein, the cooling pipes can be on both sides and in many cases arranged around other portions of the exterior of the pump 160.

Figure 4A:
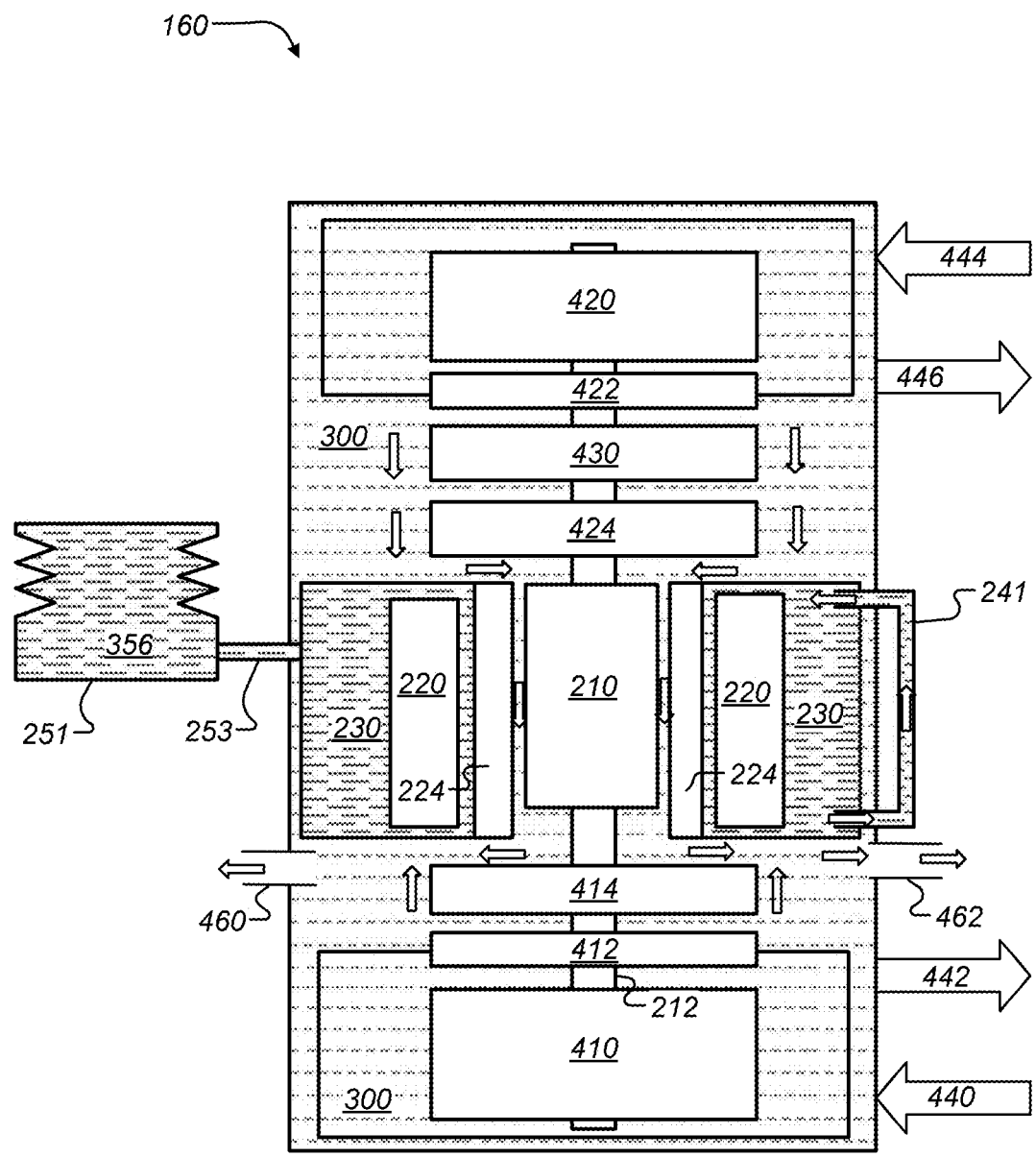
FIGS. 4A and 4B are block diagrams illustrating further aspects of electric subsea fluid processing machines, according to some other embodiments.
Figure 4B:
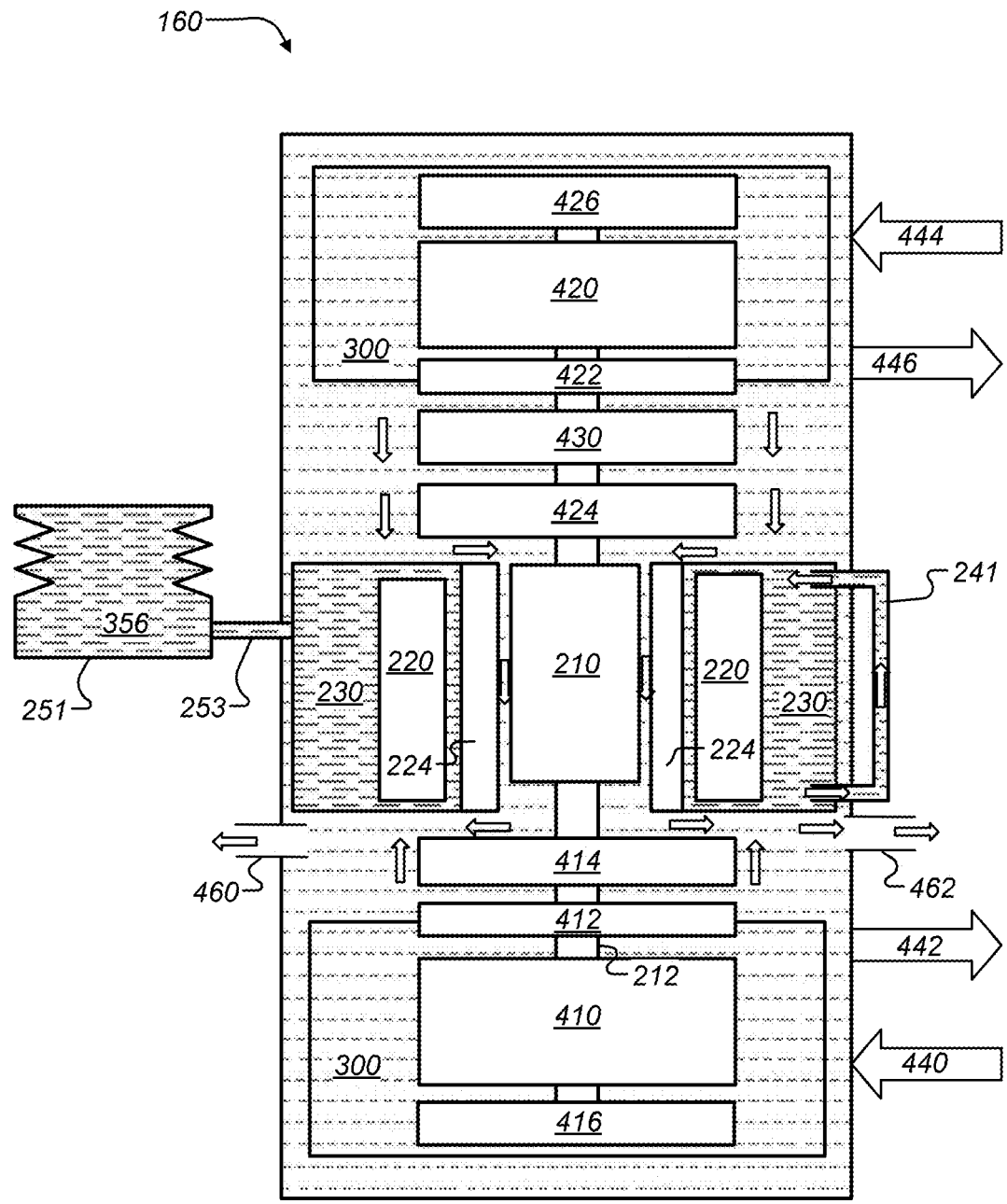

FIGS. 4A and 4B are block diagrams illustrating further aspects of electric subsea fluid processing machines, according to some other embodiments. In the embodiments shown, the pump 160 includes a single motor that drives two pump sections configured in a "back to back" arrangement such that the axial forces of the impellers and diffusers in the two pump sections partially or fully offset each other. In particular, the motor portions of pumps 160 shown in FIGS. 4A and 4B can be similar or identical to the motor portions shown in FIGS. 2A, 2B and/or 3. The motor portion rotates the shaft 212 which, in turn, drives the upper and lower pump portions. The lower pump portion includes impellers and diffusers 410, balance piston 412 and a single radial bearing 414 in the case of FIG. 4A, and two radial bearings 414 and 416 in the case of FIG. 4B. Likewise, the upper pump portion includes impellers and diffusers 420, balance piston 422 and a single radial bearing 424 in the case of FIG. 4A, and two radial bearings 424 and 426 in the case of FIG. 4B. The lower pump portion has processing fluid inlet 440 and outlet 442, while the upper pump portion has a process fluid inlet 444 and outlet 446. According to some embodiments, the outlet 442 of the lower pump portion is configured to feed directly into inlet 444 of the upper pump portion. In such cases the lower and upper pump portions are arranged "in series". The upper pump portion also includes a thrust bearing 430 which in these embodiments is sufficient for handling axial loads. In general, the configuration of the radial and thrust bearings in terms of both numbers and locations will depend on a variety of factors including: the number, design and operating range of the impeller and diffuser stages 410 and 420, and the length of shaft 212. Note that the flow of the small amount of process fluid that "leaks" or flows past the balance pistons 412 and 422 flows through the motor portion and thereby lubricates and cools the motor portion in the same way described elsewhere herein. Instead of a single upper vent 260 (shown in FIGS. 2A, 2B, and 3) there are two side vents 460 and 462 provided in the examples of FIGS. 4A and 4B. Note that although two side vents are shown schematically in FIGS. 4A and 4B, in practice there can be other numbers of vents (e.g. 3 or more) arranged in different circumferential locations.

Figure 5:
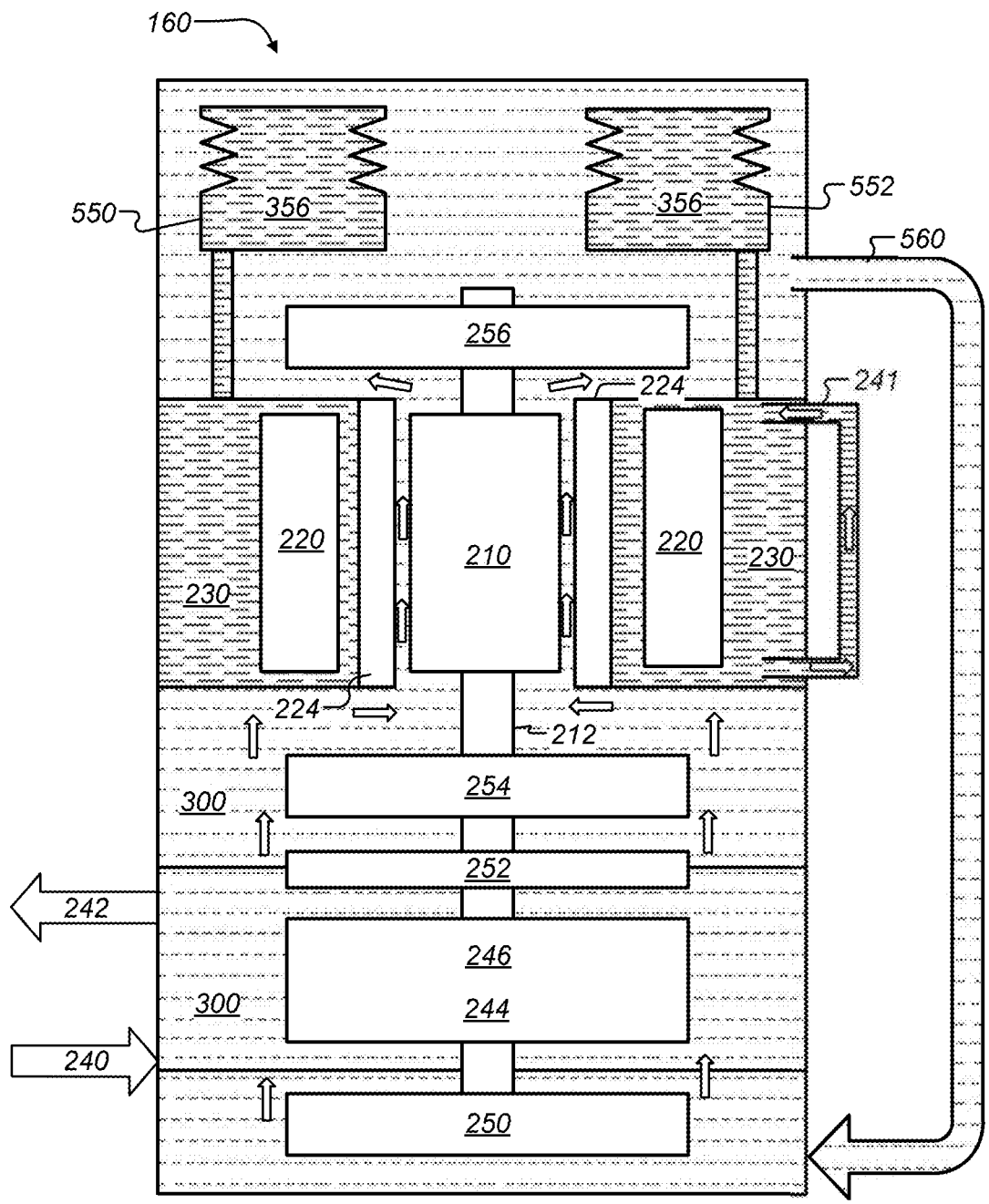
FIG. 5 is a block diagram illustrating further aspects of an electric subsea fluid processing machine, according to some other embodiments.

FIG. 5 is a block diagram illustrating further aspects of an electric subsea fluid processing machine, according to some other embodiments. In this example, pump 160 includes a motor portion that is similar or identical to those shown in FIGS. 2A, 2B, 3, 4A and/or 4B. The pump portion is also similar or identical to those shown in those figures. However, instead of venting the process fluid that has flowed past the balance piston(s) to the environment, the process fluid is circulated going back to intake of the pump via conduit 560. Additionally, the pressure compensation of the dielectric stator fluid is positioned internally within the housing of pump 160. In the example shown in FIG. 5, since the process fluid is not vented or emitted into the environment, such embodiments could be used, for example, in fluid processing applications where the processed fluid is single phase and not allowed in the outside environment. For example, the pump 160 could be used for subsea pumping of MEG or other chemicals. According to some embodiments, the conduit 560 is configured as a conduit (e.g. drilling) within the central shaft 212. Also shown in FIG. 5 are stator volume compensators 550 and 552 that are housed within the motor portion housing. According to some embodiments, the configuration shown in FIG. 5 could be used where the inlet pressure is not necessarily similar to that of the environment. In such situations pressure balance directly to the environment may not be possible or practical.

Although not shown, according to some embodiments, either or both of the process fluid re-circulation and/or the internal stator fluid pressure compensation aspects can be combined with pumps in a back-to-back configuration such as shown in FIGS. 4A and 4B. According to some embodiments, in the case where the process fluid includes solid material, a ceramic material can be used as a canning material for inner stator canning 224 and/or bearings 250, 254 and/or 256.

Although throughout this description the small amount of process fluid flowing past the balance piston(s) is sometimes described as "leaking" the flowrates under operating conditions is generally known and configured. According to some embodiments, one or more nozzles are provided at or near the balance piston(s) so that the flowrates of the process fluid past the balance piston(s) can be further configured or "tuned" for cooling optimizations.

FIGS. 6A to 6G are block diagrams illustrating further aspects of electric subsea fluid processing machines, according to some other embodiments. The embodiments shown can be particularly useful for subsea fluid processing applications where the process fluid is not directly suitable for lubricating and cooling by passing through the motor portion. Examples of such applications are where the process fluid is multiphase and includes gas and/or solid particulate matter. In one example, the process fluid can be a multiphase hydrocarbon fluid such as produced from a well.

Figure 6A:
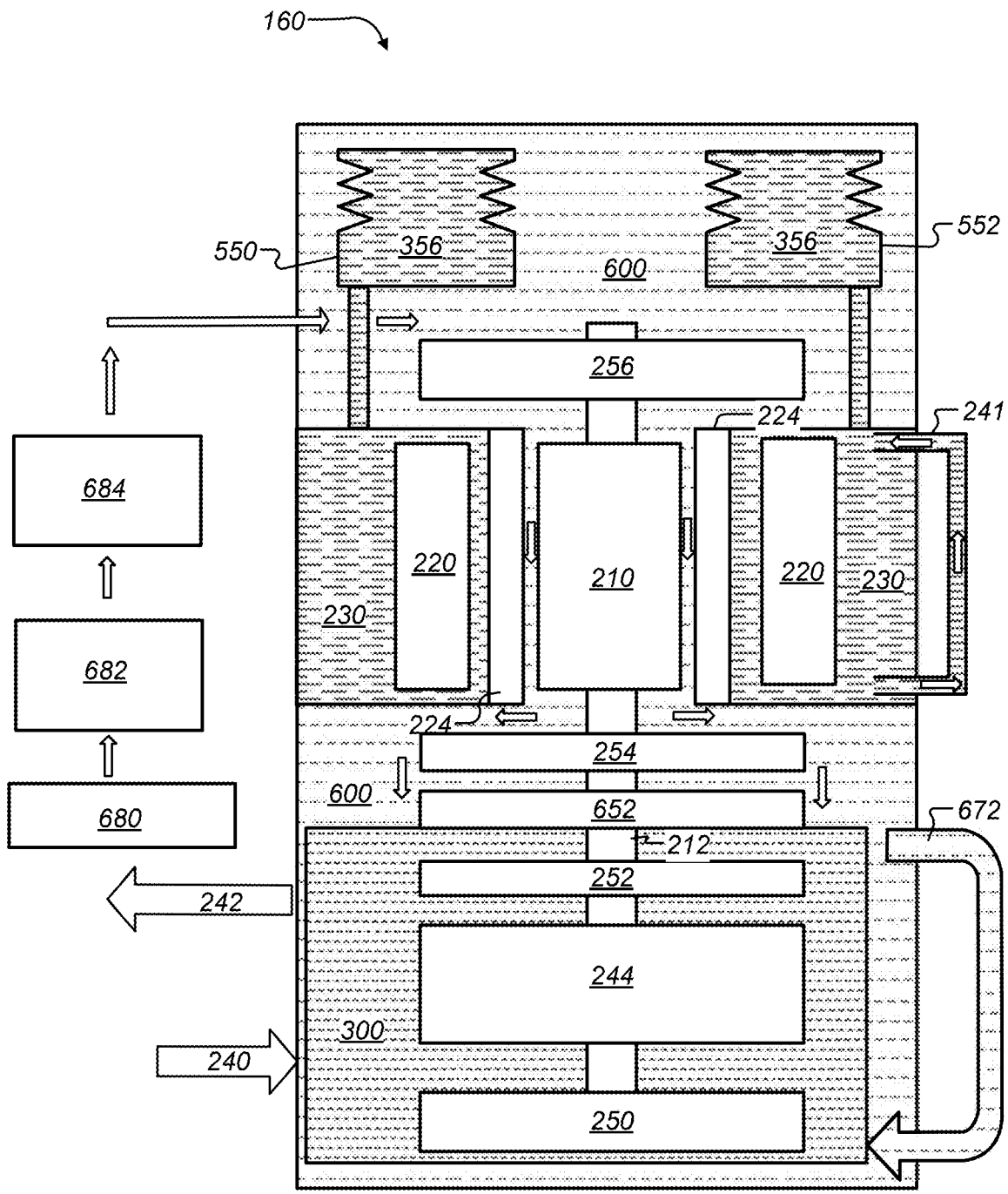
FIGS. 6A to 6G are block diagrams illustrating further aspects of electric subsea fluid processing machines, according to some other embodiments.

In FIG. 6A, the motor and pump portions of pump 160 are similar or identical in some aspects to that shown in FIG. 5. However, the flow of fluid through the motor portion is "reversed" from that shown in FIG. 5. In the case of FIG. 6A, a portion of the higher-pressure process fluid 300 from the outlet 242, is separated using flow splitter 680 which is configured to pass only liquid phase into pressure regulator 682. Pressure regulator 682 is configured to control the pressure of the fluid so that it flows at a desirable rate through the motor portion of pump 160. Pressure regulator 682 can be either an active or passive. Examples of an actively controlled regulator 682 include an electrically operated valve(s), such as a directional control valve (DCV). According to some embodiments, the pressure regulator 682 can be self-regulated by a mechanical valve set to maintain pressure within a certain envelope. For control, the pressure regulation device 682 may have a connection to the process fluid 300, although this is not shown for simplicity. The single-phase fluid is then passed through a process cooler 684 and then into the upper portion of the motor portion of pump 160 as shown. The fluid flow direction is shown with the hollow arrows. The single-phase fluid flows downwards (instead of upwards) through upper radial bearing 256 and between the rotor 210 and inner stator canning 224. The fluid then flows through thrust bearing 254 and a mechanical seal 652. The "barrier" fluid is mixed with process fluid coming from balance piston 252, then flows through a conduit 672 and enters the pump portion through the lower radial bearing 250, which in this case is process lubricated. Note that this is a mixed fluid which may contain solids. According to some embodiments, the bearing material may be ceramic and can tolerate solids. According to some embodiments, the restriction characteristics of mechanical seal 652 should be considered when configuring pressure regulator 682. Since viscous losses can lead to significant temperature increases, in some cases a ceramic material may be used for the stator inner canning 224.

Figure 6B:
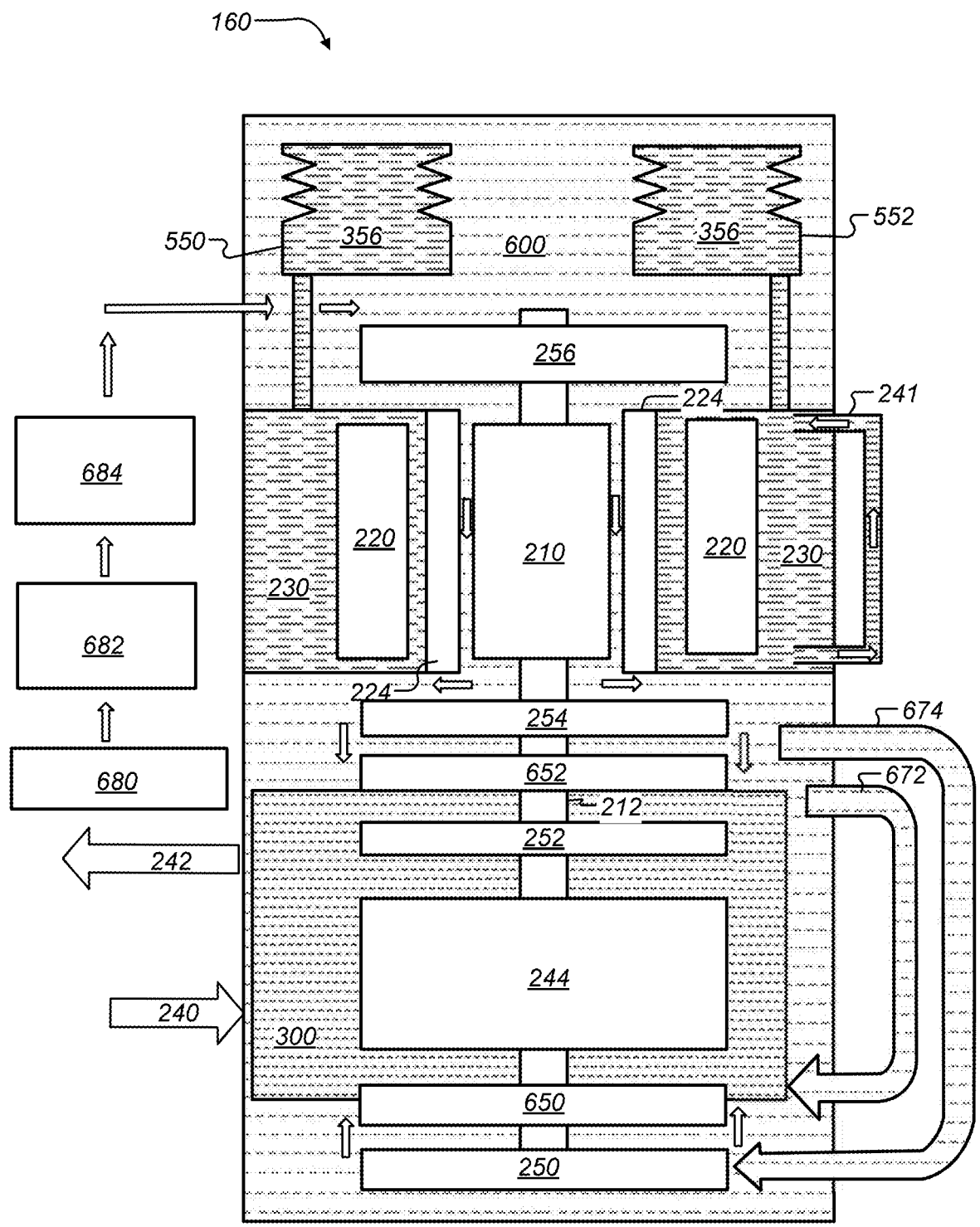

FIG. 6B is similar or identical to FIG. 6A in most respects, except that a mechanical seal 650 is provided above lower radial bearing 250. Since mechanical seal 650 will provide a significant restriction, according to some embodiments, separate conduits 672 and 674 can be provided to secure sufficient flow to bearing 250 and mechanical seal 650, respectively. In case of insufficient pressure there are opportunities to add an internal circulation impeller (not shown) between thrust bearing 254 and mechanical seal 652. According to some embodiments, mechanical seals 650 and 652 can be a labyrinth seal or other dynamic seal element.

Figure 6C:
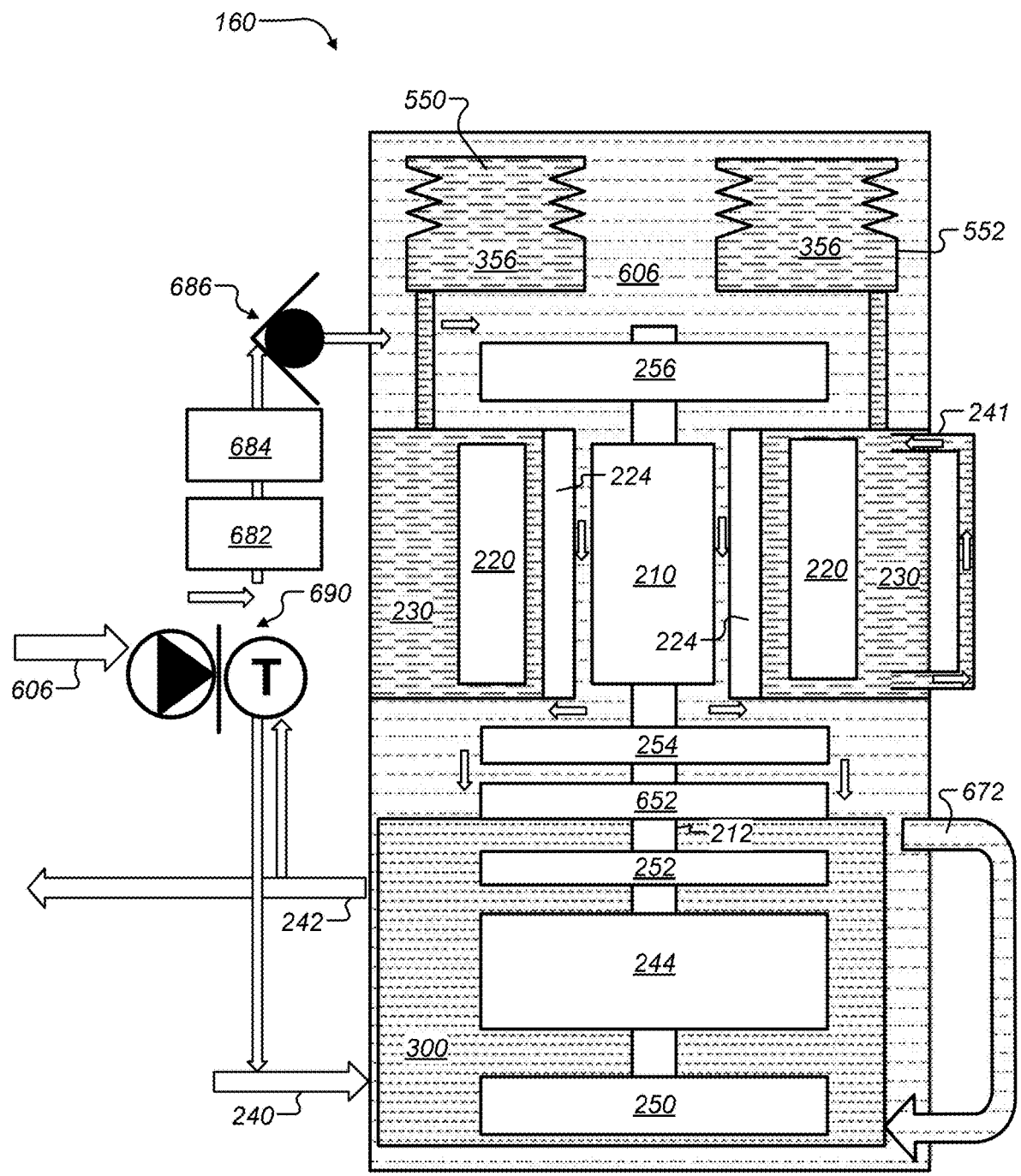

FIG. 6C is similar or identical to FIG. 6A in most respects, except that a turbine driven pump 690 is provided to draw in sea water 606 to use as the lubricant and cooling for the bearings, mechanical seals and motor portion. In this case, there will be a limited amount of sea water ingress into the process fluid. The pump 690 may be driven using a magnetic coupling (not shown) to the shaft 212. The sea water flows through pressure regulator 682 and cooler 684 (if needed). A check valve 686 can be provided for added security against backflow. According to some embodiments, mechanical seal 652 can be configured to provide adequate flow rate and pressure drop characteristics. According to some other embodiments, nozzles or other pressure control devices can be configured to bypass of mechanical seal 652 if beneficial in some applications. According to some embodiments, an additional mechanical seal can be provided, and the lower radial bearing configured as shown in FIG. 6B.

Figure 6D:
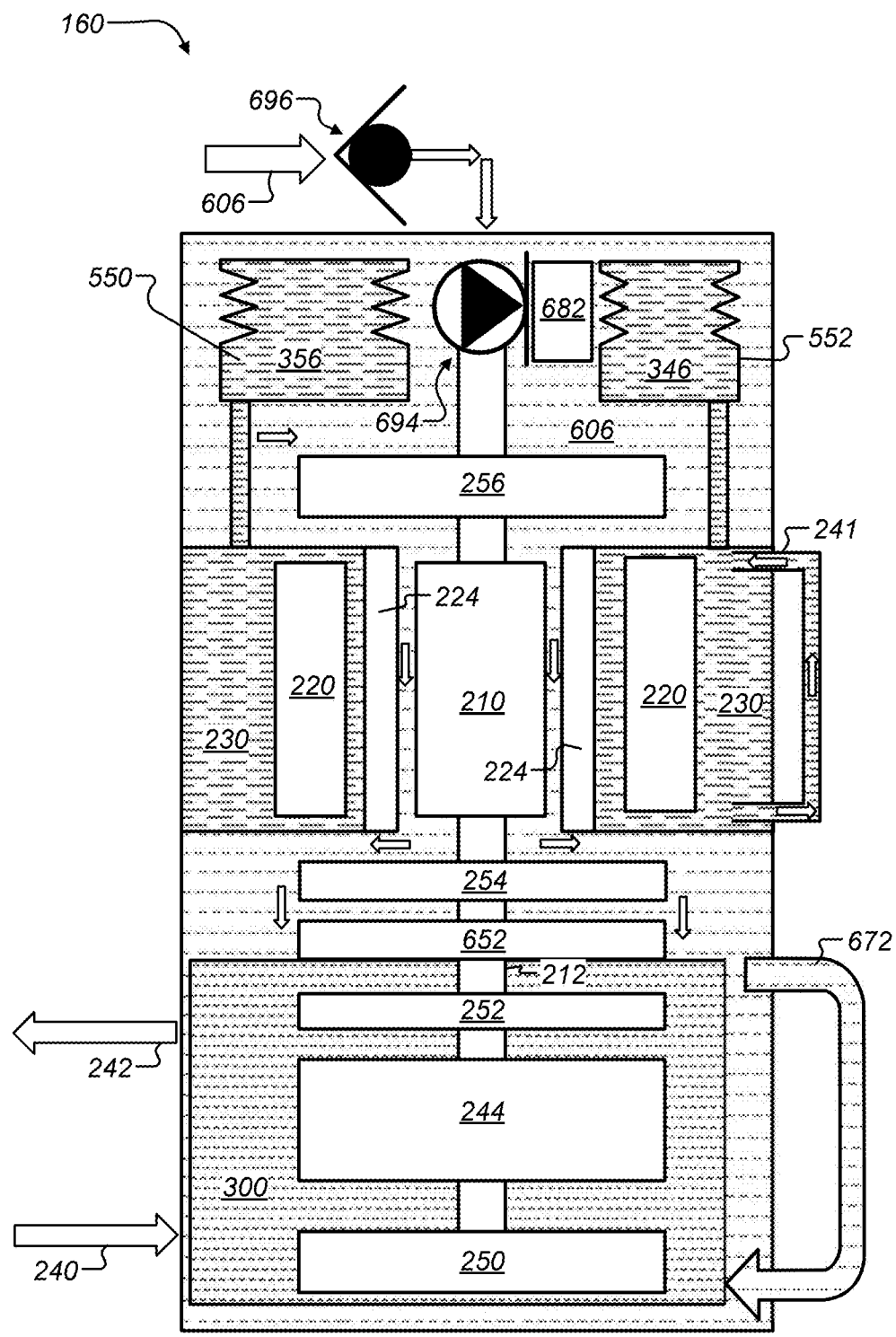

FIG. 6D is similar or identical to FIG. 6C in most respects, except that a shaft driven pump 694 can be configured to draw sea water 606 as the lubricant for bearings and mechanical seal(s) as shown. Check valve 696 provides a double barrier between the process fluid 300 and the outside environment. According to some embodiments, a magnetic coupling can be provided to drive cooling fluid circulation in stator volume 230, such as with impeller 270 shown in FIG. 2A. As in the case of FIG. 6C, mechanical seal 652 can be configured to provide adequate flow rate and pressure drop characteristics, and according to some other embodiments, nozzles or other pressure control devices can be configured to bypass mechanical seal 652 to secure overall components and pressure integrity. According to some embodiments, an additional mechanical seal can be provided, and the lower radial bearing configured as shown in FIG. 6B.

Figure 6E:
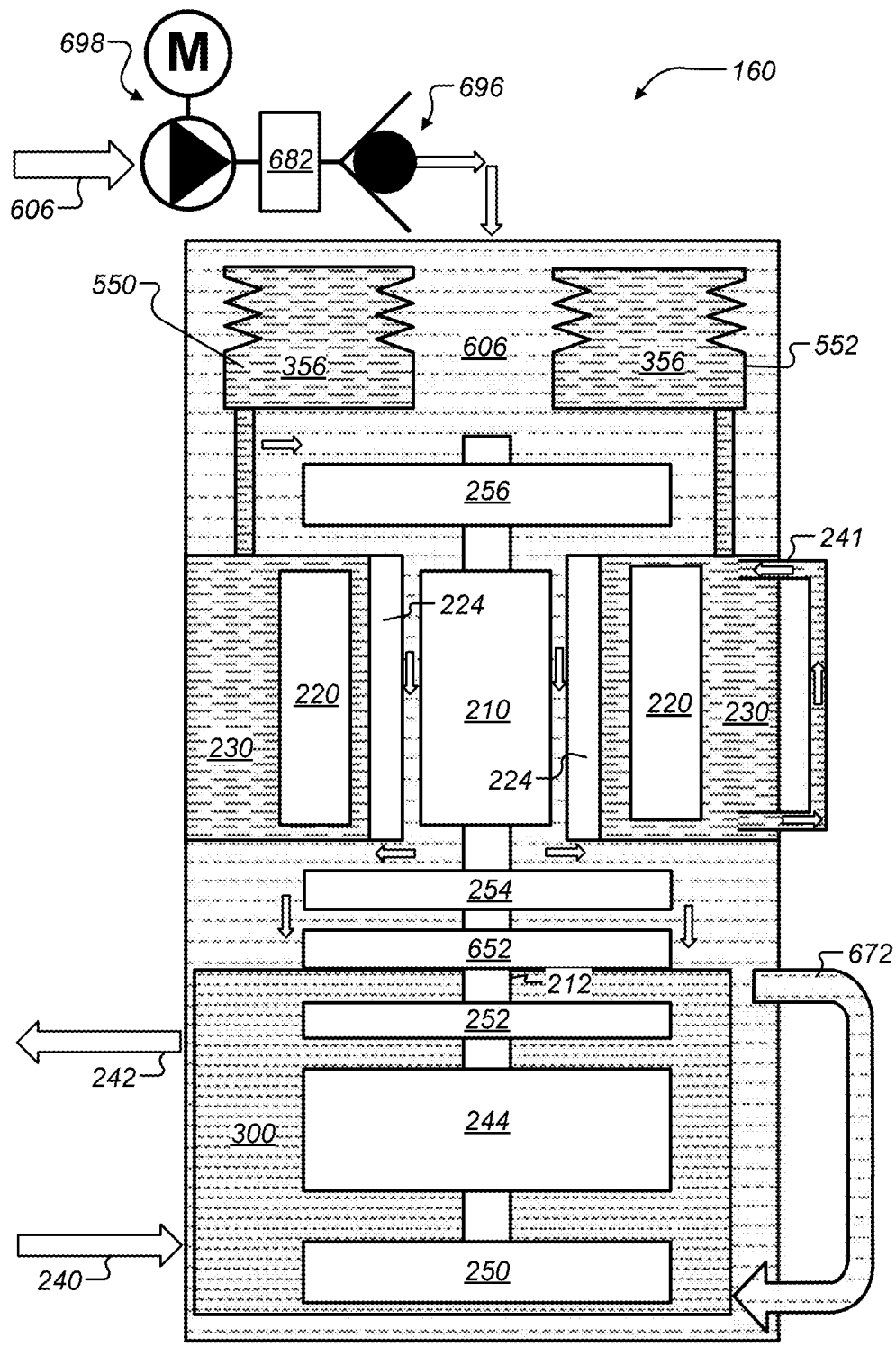

FIG. 6E is similar or identical to FIG. 6D in most respects, except that a power driven auxillary pump 698 is provided to draw sea water as the lubricant for bearings and mechanical seal(s). A pressure regulator 682 is shown that is configured to regulate overpressure by sensing the pressure differential between fluid 606 and 300 at inlet 240 due to location of balance piston 252. This pressure regulation can be hydraulically self-controlled by a mechanical valve designed to keep overpressure within and an envelope, alternatively by electrically operated valves and an electrical control system, as described supra, with respect to FIG. 6A.

Figure 6F:
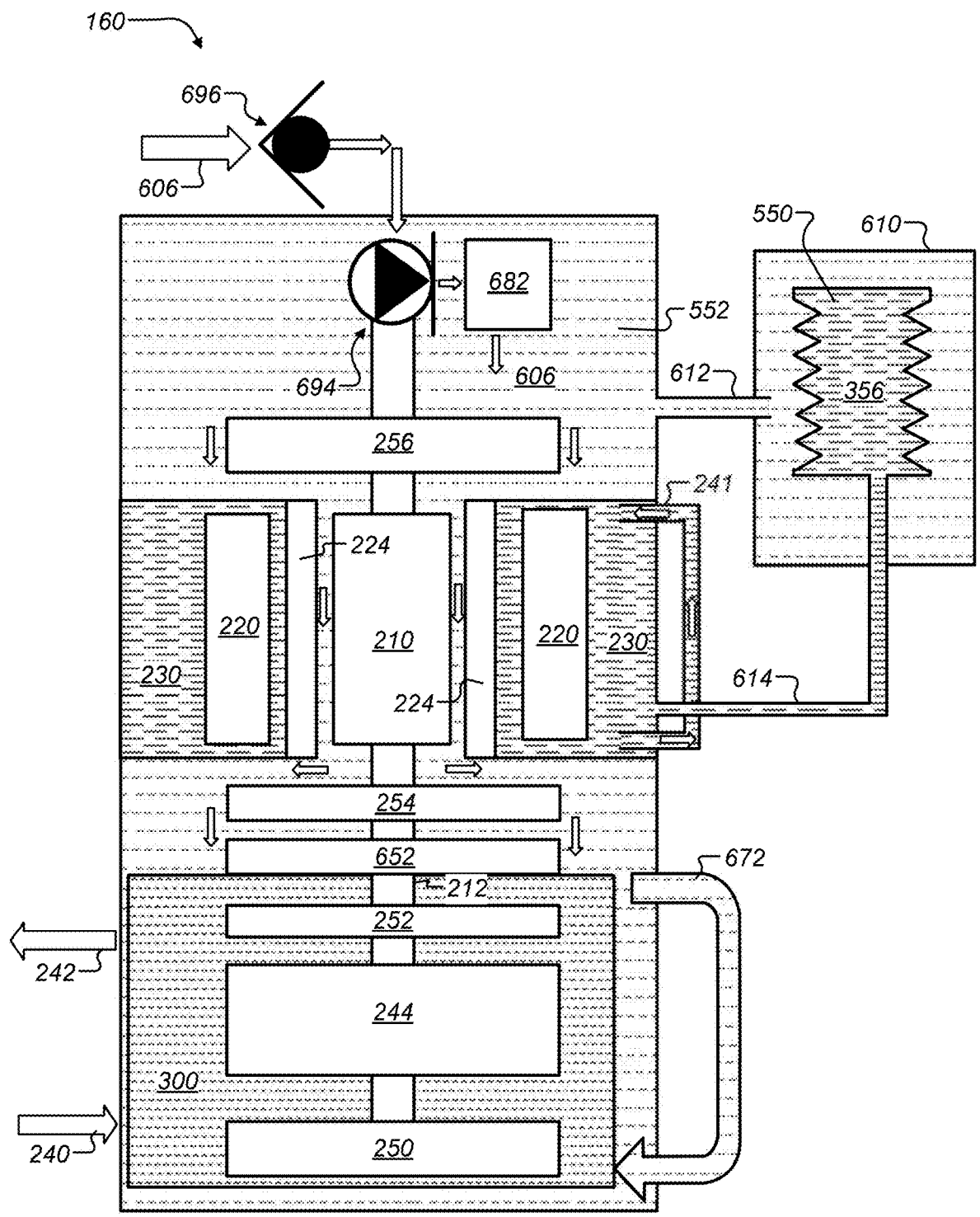

FIG. 6F is similar or identical to FIG. 6D in most respects, except the stator fluid volume compensator 550 is provided in a separate housing 610. Note that housing 610 is in fluid communication with the motor portion housing via conduit 612 and compensator 550 is in fluid communication with stator volume 230 via conduit 614. The arrangement shown in FIG. 6F might be preferable in some applications due to size and space restrictions.

Figure 6G:
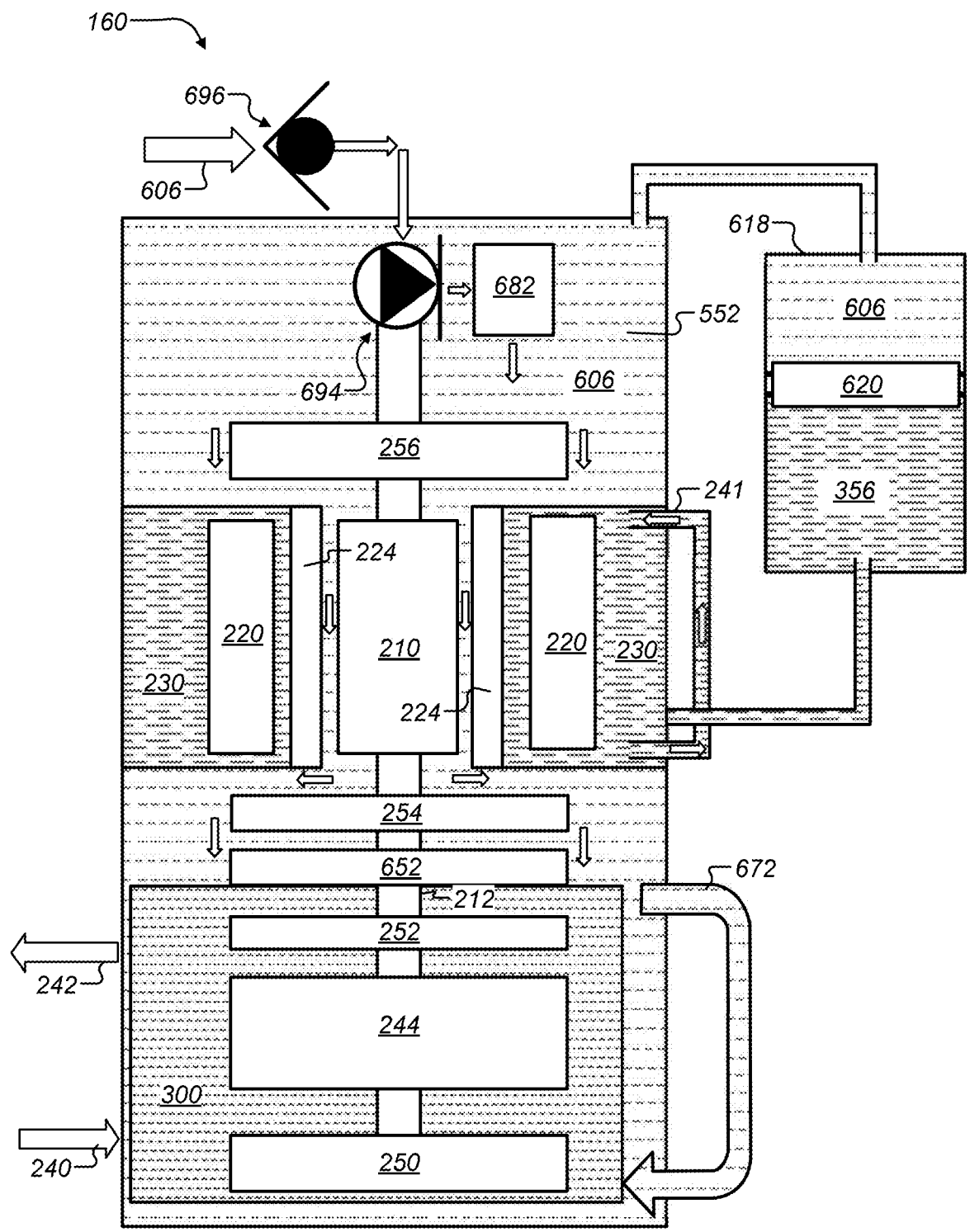

FIG. 6G is similar or identical to FIG. 6F in most respects, except that the stator fluid volume is compensated using an accumulator-like arrangement wherein a cylinder 618 includes a moveable piston 620 that separates volumes of sea water 606 and stator fluid 356.

According to some embodiments, FIGS. 6C, 6D, 6E, 6F and 6G can include a seawater treatment module. This module may include filtration and according to some embodiments, a desalination module. Due to limited volume needed, a different known desalination technology can be used compared to high volume nano filters. For example, a subsea deployable low volume, high pressure water treatment device such as used for ship drinking water production systems can be used. According to some embodiments, this module can include an oxygen scavenger that is configured to reduce dissolved oxygen in water for reducing corrosion. According to some embodiments, FIGS. 6C-6G, can use other chemicals that can exist subsea as a consumable barrier fluid instead of treated or un-treated sea water.

Although much of the description provided herein has been in the context of fluid pumps, the devices 160 can be configured for other types of subsea fluid processing. For example, the described device 160 can be configured as a subsea multiphase fluid compressor. According to some embodiments, the devices shown in any of FIGS. 6A-6G is configured as a contra-rotating compressor and the layout includes two motors with independent fluid supplies for each motor. While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures.

What is claimed is:

1. A subsea process fluid processing system, comprising:
 a housing having a first inlet, a second inlet, a first outlet and a second outlet;
 an elongated impeller shaft disposed within the housing;
 a first set of impellers disposed within the housing, wherein the first set of impellers is fixedly mounted to the elongated impeller shaft, and the first set of impellers is configured to rotate to drive a flow of a process fluid through the housing from the first inlet to the first outlet;
 a second set of impellers disposed within the housing, wherein the second set of impellers are fixedly mounted to the elongated impeller shaft, and the second set of impellers is configured to rotate to drive a flow of a process fluid through the housing from the second inlet to the second outlet;
 a chamber enclosed by an outer sleeve, a first end piece, a second end piece, and an inner canning of non-metallic material, wherein the chamber further comprises a third end piece positioned between the first end piece and the second end piece;
 an electric motor coupled to the elongated impeller shaft, wherein the electric motor is configured to drive rotation of the elongated impeller shaft and the first set of impellers about a main longitudinal axis, wherein the flow of the process fluid is internally split within the housing between a first flow path from the first set of impellers to the first outlet and a second flow path from the first set of impellers through the electric motor and in a direction toward the second set of impellers, and wherein the electric motor comprises:
  a rotor fixedly mounted to the elongated impeller shaft;
  a canned fluid filled stator, dimensioned and positioned to surround the rotor, and being filled with a dielectric stator fluid and sealed at least with the inner canning of non-metallic material on an inner surface facing the rotor, wherein the canned fluid filled stator is positioned in the chamber, and further wherein the canned fluid filled stator includes integrated cooling channels, wherein the integrated cooling channels are oriented parallel to the main longitudinal axis and extend through the stator and are filled with the dielectric stator fluid, and wherein the dielectric stator fluid is circulated by a forced circulation generated by the elongated impeller shaft;
 a first pump section comprising the first set of impellers, a first diffuser, the first inlet and the first outlet; and
 a second pump section comprising the second set of impellers, a second diffuser, the second inlet and the second outlet;
 wherein the pump sections are configured in an arrangement such that an axial force exerted by the first pump section is at least partially offset by an axial force of the second pump section.

2. The system according to claim 1, wherein the second flow path of the process fluid extends between the inner surface of the canned fluid filled stator and the rotor.

3. The system according to claim 1, wherein the process fluid comprises sea water.

4. The system according to claim 3, wherein the sea water is configured to receive treatment via a subsea treatment system, and the subsea treatment system includes at least one of a desalinization system, an oxygen scavenger, or a filtration system.

5. The system according to claim 1, wherein the process fluid is selected from a group consisting of monoethylene glycol and methanol.

6. The system according to claim 1, wherein the non-metallic material does not conduct electricity, and the non-metallic material comprises a polymer, a glass fiber material, a ceramic material, or a combination thereof.

7. The system according to claim 1, wherein the non-metallic material includes fibers of material selected from a group consisting of: aramid, Kevlar, and carbon.

8. The system according to claim 1, further comprising a pressure compensator configured to adjust the volume of the dielectric stator fluid to pressure compensate the dielectric stator fluid according to environmental fluctuations outside of the system.

9. The system according to claim 1, wherein the first set of impellers of the first pump section is driven by the electric motor.

10. The system according to claim 1, wherein the process fluid is a single-phase liquid fluid.

11. The system according to claim 1, wherein the second flow path of the process fluid extends through the electric motor and then subsequently extends through a return flow path back to an intake for passage through the first set of impellers.

12. The system according to claim 11, wherein the return flow path either comprises a conduit disposed outside of the housing or extends to a bearing upstream of the first set of impellers, or both.

13. The system according to claim 1, wherein the subsea fluid processing system comprises a balance piston between the first set of impellers and the electric motor, and the second flow path of the process fluid leaks past the balance piston and then flows through the electric motor.

14. The system according to claim 1, wherein the second flow path of the process fluid extends through the electric motor to a vent to an external environment of the housing.

15. The system according to claim 1, further comprising at least one external cooling pipe configured to provide cooling of the dielectric stator fluid.

* * * * *